United States Patent

[11] 3,602,644

[72] Inventors Marcel Rognon
Houilles;
Raymond Salvy, Suresnes, both of, France
[21] Appl. No. 804,509
[22] Filed Mar. 5, 1969
[45] Patented Aug. 31, 1971
[73] Assignee U.S. Philips Corporation
New York, N.Y.
[32] Priority Mar. 8, 1968, Mar. 29, 1968
[33] France
[31] 142928 and 146346

[54] "CIRCUIT FOR GENERATING VIDEO MARKERS FROM POTENTIALS TO BE MEASURED"
5 Claims, 15 Drawing Figs.

Figure 1:
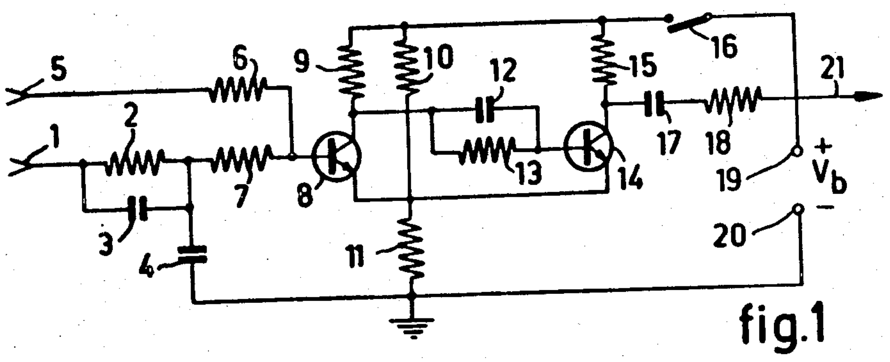

[52] U.S. Cl. 178/7.5 D, 178/DIG. 4, 178/DIG. 15, 340/324 A
[51] Int. Cl. H04n 5/44
[50] Field of Search 178/5.4 TE, 5.8, 5.8 A, 7.5 R, DIG. 4, DIG. 15, 7.5 D; 325/455; 340/212, 324 A; 315/26

[56] References Cited
UNITED STATES PATENTS

| | | | |
|---|---|---|---|
| 2,784,247 | 3/1957 | Hurford | 178/5.8 |
| 2,904,630 | 9/1959 | Bruch et al. | 178/5.8 |
| 3,502,804 | 3/1970 | Barr | 178/7.92 |

FOREIGN PATENTS

| | | | |
|---|---|---|---|
| 848,602 | 9/1960 | Great Britain | 178/6 |

*Primary Examiner*—Robert L. Griffin
*Assistant Examiner*—George G. Stellar
*Attorney*—Frank R. Trifari ABSTRACT: A circuit for generating a marker, such as a stripe, on a television screen to measure a potential, such as a power supply or AGC voltage, features a Schmitt trigger circuit. This circuit has two inputs for the measured voltage and the horizontal flyback pulse. Another embodiment features two trigger circuits, with the second circuit receiving the vertical flyback and another measured voltage. The output of the second circuit blocks the first circuit.

INVENTORS.
MARCEL ROGNON
RAYMOND SALVY
BY [signature]
AGENT

INVENTORS
MARCEL ROGNON
RAYMOND SALVY
BY
AGENT

INVENTORS.
MARCEL ROGNON
RAYMOND SALVY
BY
Frank R. Trifari
AGENT

"CIRCUIT FOR GENERATING VIDEO MARKERS FROM POTENTIALS TO BE MEASURED"

The invention relates to a television receiver. Users of television receives frequently would like to be able to perform a measurement for checking the supply voltage.

The importance of such a measure is manifest: as is known, power mains television receivers are designed for satisfactory operation within a range of voltage fluctuations of ±10 percent relative to the rated power mains voltage: permanent use in the marginal region of this range however, impairs the useful life of certain elements of the receiver, especially the electron tubes.

In order to avoid this disadvantage automatic saturated-core stablilizing devices are known some of which, which are provided with a so-called filter or harmonics correction circuit, are highly satisfactory because when fed with a sinusoidal power mains voltage they deliver a voltage which remains substantially sinusoidal and has a constant amplitude.

There are also automatic saturated-core voltage stabilizers, however, which are not provided with a filter circuit and delver an alternating voltage the effective value of which frequently is substantially constant but which is no longer sinusoidal.

Such a voltage is not suited to feed electronic circuits such as television receivers, for the direct voltage obtained by rectification of the said voltage has a value which is greatly different from the value of the voltage normally obtained when these receivers are directly fed with the substantially sinusoidal power mains voltage.

Concerning the portable television receivers provided with their own voltage supply source, for example an accumulator battery, it is also known that when the voltage of this source falls below a given threshold the electronic regulating system with which the receiver is equipped rapidly becomes inoperative.

For these reasons it is desirable for the user to have in his receiver a voltage indicating device of sufficient accuracy so that in the first case he is warned of the occurrence of abnormal power conditions in the receiver such as when the voltage has an incorrect value or shape and in the second case he may proceed to charge the self-contained supply source.

Owing to the usual construction of television receivers in which the display tube occupies substantially the entire front of the receiver, it is impracticable to mount a sufficiently accurate indicating instrument in a readily observable position.

Therefore a television receiver in accordance with the invention is characterized in that an output of a voltage supply source of the receiver is connected to a signal input of an image mark generator.

In such a receiver the measurement of the supply voltage to be checked may be performed on the display tube.

The voltage to be checked is preferably applied by means of a comparison circuit. Although the said voltage may advantageously be the supply voltage, the arrangement in accordance with the invention is not restricted thereto.

Figure 2:
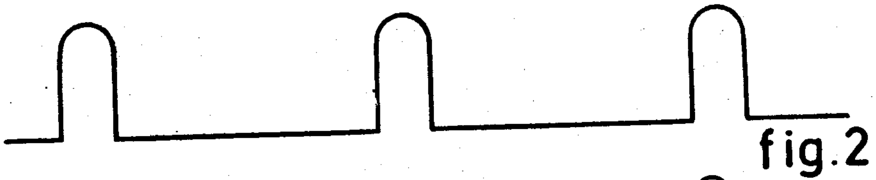
Figures 3A, 3B, 3C:
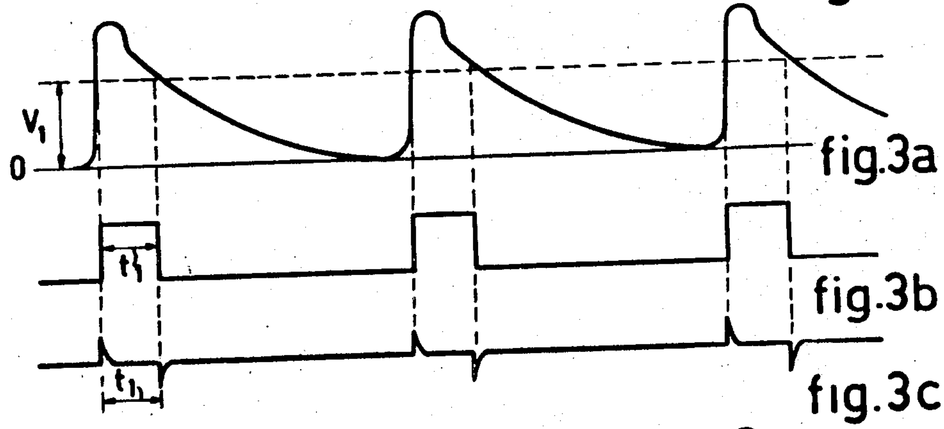
Figures 4A, 4B, 4C:
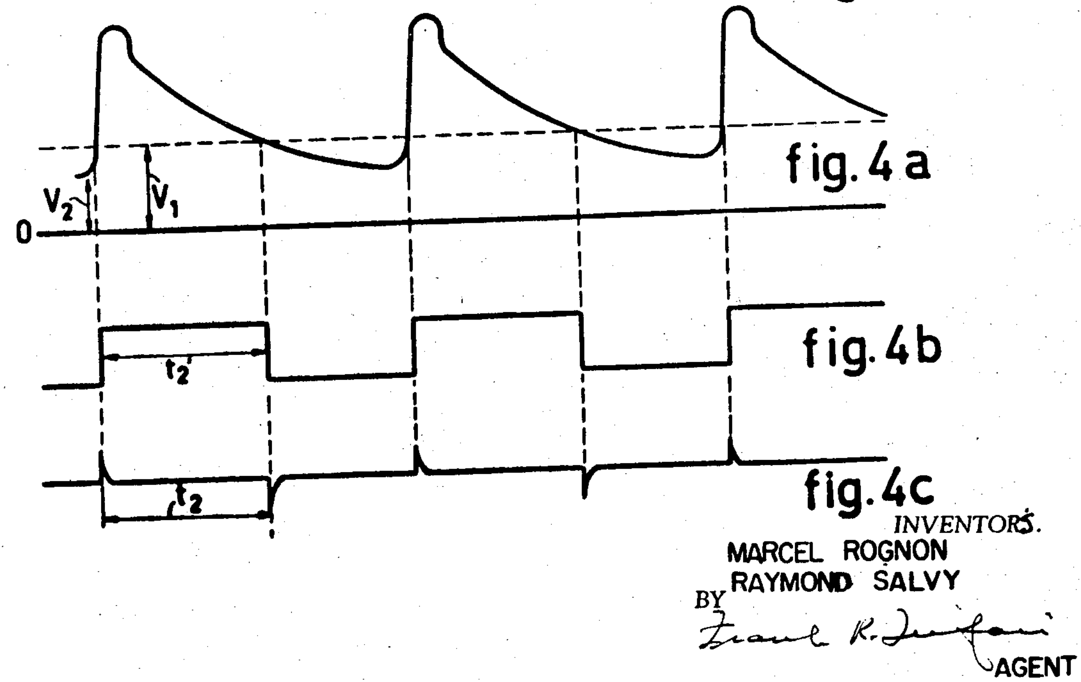
Figure 5:
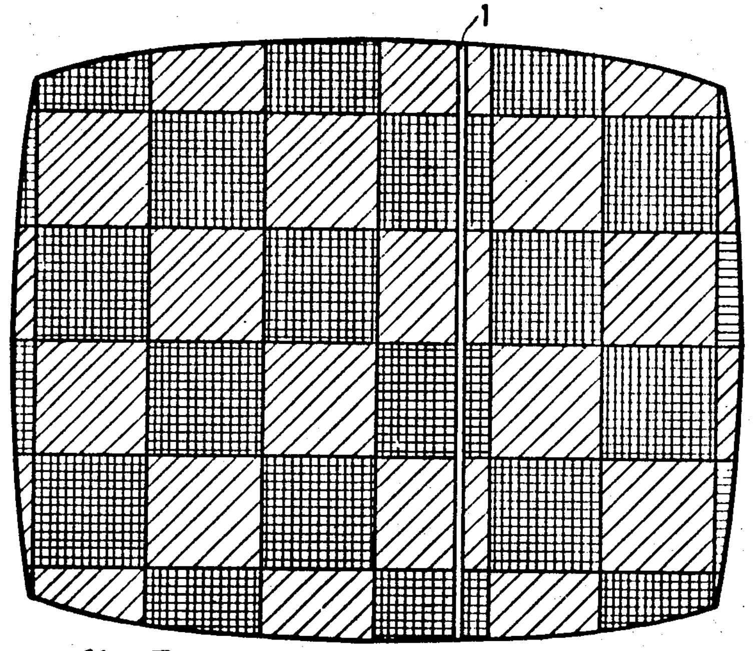
Figure 6:
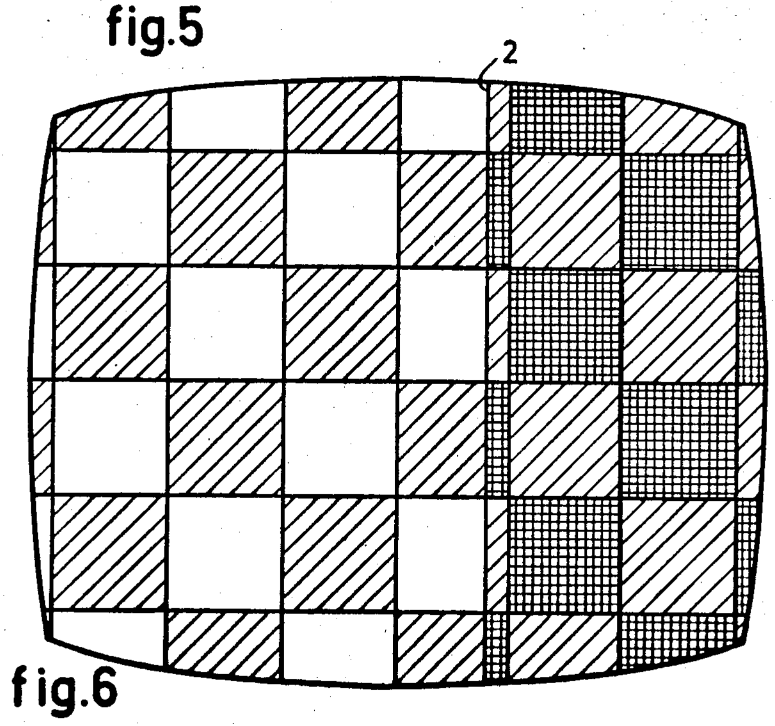
Figure 7:
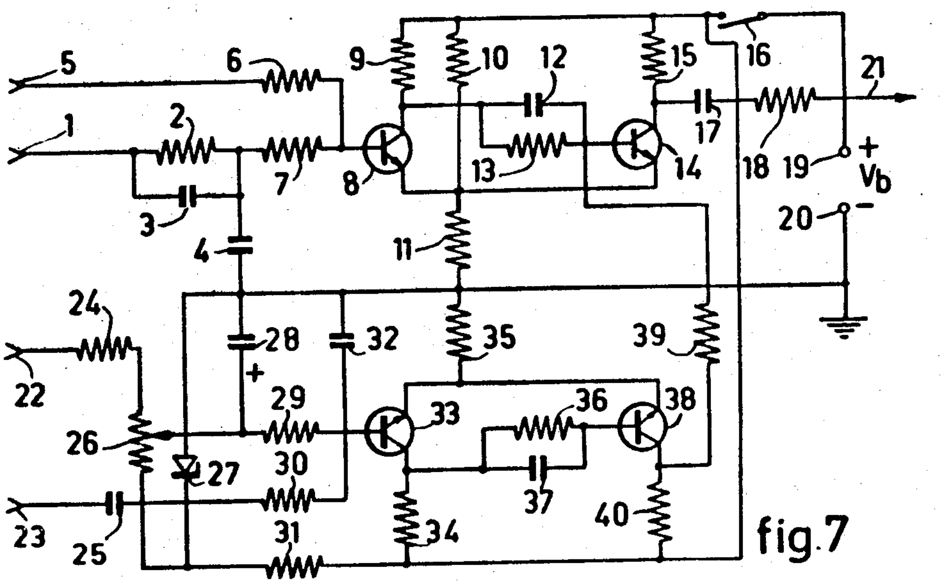
Figure 8:
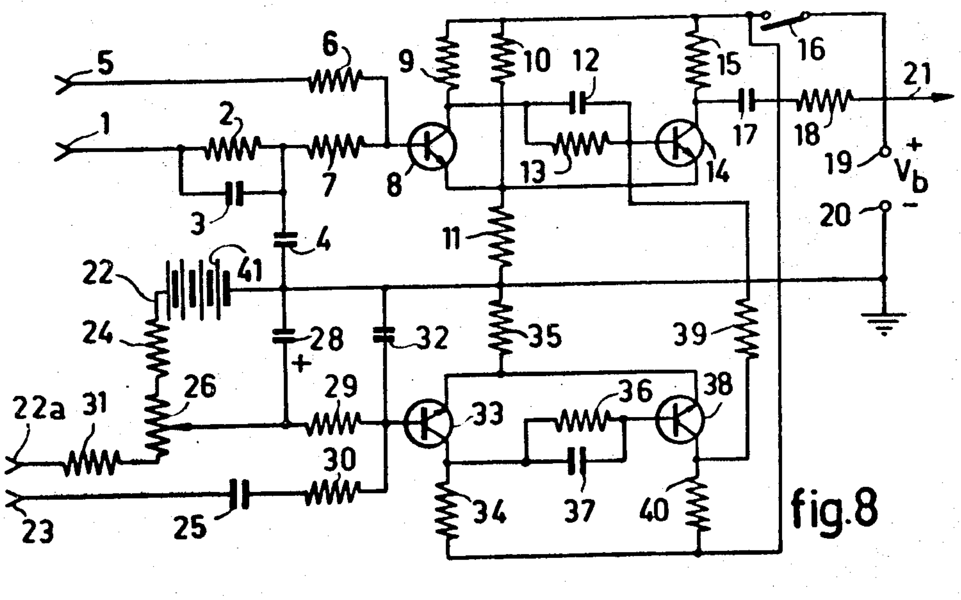
Figure 9A:
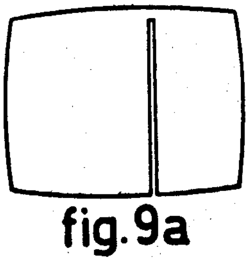
Figure 9B:
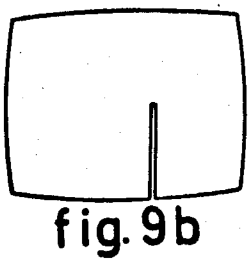
Figure 9C:
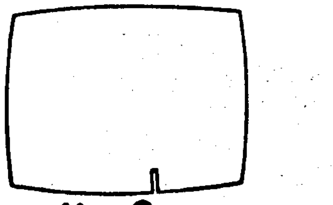

Features and advantages of the invention will appear from the following description of embodiments thereof, given by way of example only, with reference to the accompanying drawings, in which:

FIG. 1 is the basic circuit diagram of an indicating device in accordance with the invention, FIG. 2 shows the flyback pulses applied to one of the inputs of the device, FIGS. 3*a*, 3*b*, and 3*c* show the waveforms at various points of the device for the minimum voltage to be checked, FIGS. 4*a*, 4*b*, and 4*c* show the waveforms at different points of the device for a nearly maximum voltage to be checked, FIGS. 5 shows the screen of the display tube when the device is designed so as to be capable of producing a bright vertical stripe, FIG. 6 shows the screen of the display tube when the device is designed so as to be capable of producing two zones of different brightness, FIG. 7 is a basic circuit diagram of the device in accordance with the invention designed for use in a power mains receiver, FIG. 8 is a basic circuit diagram of the device in accordance with the invention for use in a receiver with a self-contained voltage supply source, for example a battery, FIGS. 9*a*, 9*b*, and 9*c* show vertical marks on the screen of the display tubes for three different values of the supply voltage.

Referring now to FIG. 1 there are applied to the base of an NPN-transistor 8 the supply voltage to be controlled from a terminal 5 through a buffer resistor 6 and also line flyback pulses from a terminal 1 through a high pass filter comprising the parallel combination of a capacitor 3 and a resistor 2 and through an integrating network comprising a capacitor 4 and a resistor 7.

The collector of the transistor 8 is fed, through a resistor 9 and a switch 16, from a positive terminal 19 of a voltage supply source V*b*, a negative terminal 20 of which is connected to ground.

The emitter of the transistor 8 is provided with a bias voltage by a voltage divider which comprises 10 and 11 and is connected between the positive terminal 19 of voltage source V*b* and ground.

The base of an NPN-transistor 14 is connected to the collector of the transistor 8 through the parallel combination of resistor 13 and a capacitor 12, the emitter of the transistor 14 being connected to that of the transistor 8 and the collector of the transistor 14 being connected through a resistor 15 to the positive terminal of the voltage source V*b*.

An output terminal 21 is connected through the series combination of a resistor 18 and a capacitor 17 to the collector of the transistor 14.

The transistors 8 and 14 together with the other circuit elements form a Schmitt trigger circuit.

The operation of the arrangement in accordance with the invention is as follows.

The flyback pulses (FIG. 2) are converted into a pseudosawtooth signal (FIG. 3*a*). The distortion introduced by the high pass filter 2, 3 permits of obtaining a nearly vertical leading edge with consequent improvement of the operation of the trigger circuit.

The operation of a Schmitt trigger circuit is known: it changes its state when the voltage applied to its input reaches a given threshold value and returns to the initial state when this voltage falls below a given threshold value. In the embodiment described, these two threshold values may be considered as a single value, which in FIG. 3*a* is represented by the voltage $v_1$ with respect to ground.

As will be seen from the Figures, when no voltage to be controlled in applied to the terminal 5 the part of the integrated signal which exceeds the voltage $v_1$ causes the trigger circuit to change to the other state during a time $t_1$ (FIG. 3*b*) with the result that a square wave voltage is produced at the collector of the transistor 14.

Differentiation of the signal shown in FIG. 3*b* by means of the capacitor 17 results in the pulses show in FIG. 3*c* which are likewise spaced by time intervals $t_1$. The first of these pulses is produced during the time in which the flyback pulse shown in FIG. 2 occurs, i.e. outside the visible portion of the image; in contrast therewith the second pulse, which is applied through the terminal 21 to the video-frequency amplifier, produces a bright spot near the beginning of each visible scanning line hence a vertical stripe on the left-hand side of the screen.

In FIG. 4*a* a supply voltage of a value $v_2$ to be controlled is applied to the terminal 5; as will be seen, under these conditions, with the same amplitude of the integrated signal and with the same value of the trigger voltage $v_1$, the change of state of the trigger circuit produces a pulse having a width $t_2$ (FIG. 4*b*) which after differentiation (FIG. 4*c*) gives two pulses which are likewise spaced by a time interval $t_2$ and the second of which produces a bright vertical line which in the embodiment described is located nearly at the center of the image.

It should be noted that the position of the first pulse is substantially constant owing to the steepness of the leading edge of the integrated signal.

The ratio between the values of the two resistors 10 and 11 determines the threshold voltage of the trigger circuit. This ratio may be adjustable to ensure that even if the voltage *v* to be controlled never is zero the bright strip can be adjusted on the extreme left-hand side of the screen.

The supply switch 16 may be mechanically coupled with, for example, a pushbutton having a make contact.

The embodiment described provides a bright vertical line on the screen of a television receiver, as is shown at 1 in FIG. 5. It is possible to obtain a bright zone of variable surface area as shown in FIG. 6 by the use, with correct polarity, of the nondifferentiated square wave pulses shown in FIGS, 3*b* and 4*b*, the trailing edge of the square wave pulse shown in FIG. 4*b* forming the transition line 2 of FIG. 6; for this purpose the value of the buffer resistor 18 must be considerably increased.

It should be noted that, if required the above described circuit arrangement may also be used in a manner not shown to measure any voltage applied to the terminal 5. An example would be checking the automatic gain control voltage of a television receiver.

In a television receiver provided with a supply voltage checking circuit of the kind described or in a portable television receiver in which the battery voltage is measured in the manner described, maximum and minimum marks may be made on the mask surrounding the display screen.

When the above described mark generator is also used for other measurement, the terminal 5 must be connected to the common contact of a changeover switch having several positions, for example for tuning control and voltage checking.

In FIG. 7 a Schmitt trigger circuit including transistors 8 and 14 and input and output circuits is identical to that shown in FIG. 1. Like parts are designated by the same reference numerals. In this arrangement, there is applied to the input 5 a voltage taken from an automatic gain control loop in order to enable the tuning of the television receiver to be checked by means of the horizontal displacement of the mark.

A second Schmitt trigger circuit includes two NPN-transistors 33 and 38.

To the base of the transistor 33 is applied, through a resistor 29, the voltage to be checked taken from the terminal 22, and through a capacitor 25 and a resistor 30, a frame-frequency deflecting voltage taken from a terminal 23.

A voltage divider comprising a resistor 31, a potentiometer 26 and a resistor 24 is connected between the positive terminal of the voltage supply source $V_b$and the terminal 22 to which the voltage to be measured is applied; a Zener diode 27 is connected between the junction of the resistor 31 and the potentiometer 26 and ground.

The slide contact of the potentiometer 26, which is connected to the base of the transistor 33 through the resistor 29, is further decoupled to ground by a capacitor 28, the base itself being partially decoupled by a capacitor 32.

The collector of the transistor 33 is fed through a resistor 34 from the positive terminal of the voltage supply source $V_b$.

The emitters of the transistors 33 and 38 are connected to one another and through a resistor 35 to ground.

The base of the transistor 38 is connected to the collector of the transistor 33 through the parallel combination of a resistor 36 and a capacitor 37,. The collector of the transistor 38, which is connected to the positive terminal of the voltage supply source $V_b$, through a resistor 40, is connected to the base of the transistor 14 through a resistor 39.

The circuit arrangement shown in FIG. 7 operates as follows: the voltage at the terminals of the Zener diode 27 forms a positive reference voltage supply source connected as a comparison voltage supply source for a negative supply voltage to be measured which is applied to the terminal 22. The voltage to be measured may, for example, be obtained in a manner not shown by rectification of an alternating voltage taken, for example, from a filament voltage winding of the supply transformer.

The frame deflection voltage which is applied through the input 23 and from which the line deflection components have been removed by the capacitor 32 causes the second trigger circuit 33, 38 to change state in the same manner as in the circuit arrangement shown in FIG. 1 at an instant which depends upon the value of the voltage applied to the base of the transistor 33. The frame-frequency variable-width square wave pulse which than is produced at the collector of the transistor 38 and is applied to the base of the transistor 14 blocks the operation of the first trigger circuit so that it causes part of the vertical stripe on the display screen to disappear. The potentiometer 26 makes it possible to give the vertical stripe a length corresponding with a given voltage to be measured.

By a suitable choice of the values of the circuit elements of the comparison circuit, of the polarity of the variation of the supply voltage to be measured and of the frame deflection voltage there may be obtained on the display screen a vertical stripe the height of which is proportional the voltage fluctuations of the voltage supply source, an indication of correct tuning being provided by a horizontal displacement of the stripe.

In a power mains television receiver, for example, FIG. 9*a* shows a power mains voltage exceeding the rated value by 10 percent FIG. 9*b* the rated value of the power mains voltage and FIG. 9*c* a power mains voltage 10 percent below the rated value, for the same tuning.

In FIG. 8 in which like parts are designated by the same reference numerals as in FIG. 7, a battery 41 of a portable television receiver is the voltage source to be checked, a terminal 22*a* having applied to it a negative reference voltage which may be obtained, for example, in a manner not shown by rectification of the line deflection voltage and stabilization by a Zener diode; in order to obtain the same direction of change of the vertical stripe in this case as in the circuit shown in FIG. 7, the direction of change of the sawtooth must be reversed with respect to that used in the circuit arrangement of FIG. 7.

Under these conditions, for a battery-fed television receiver, for example, the vertical stripe of FIG. 9*a* may indicate the voltage of a fully charged battery or the voltage during the process of charging from the power mains, that of FIG. 9*b* the voltage of a half-charged battery and that of FIG. 9*c* a completely discharged battery at the instant at which the electronic stabilizing circuit for the supply battery $V_b$of the receiver tends to become inoperative.

Obviously, the direction of change of the vertical stripe shown in FIGS. 9*a* to 9*c* is not the only one possible and the stripe may, for example, start at the tip of the screen or the height of the stripe may be inversely proportional to the voltage; the method described has the advantage of agreeing with the logic standards commonly used in measurements. In another possible modification, tuning indication may take place in a vertical direction an voltage indication in a horizontal direction.

An alternative embodiment described with reference to FIG. 1 consists in the production of two zones of different brightness on the screen of the display tube, the mark on the display tube not being a vertical stripe but being a rectangle of which the length depends on the tuning and the height on the supply voltage, or conversely.

Obviously, modifications may be made in the embodiments described, especially by replacing certain technical means by other, equivalent means, without departing from the scope of the invention.

What is claimed is:

1. A circuit comprising television horizontal and vertical frequency image mark generators each having input means for receiving respective potentials to be measured; each of said generators comprising a Schmitt trigger circuit including two transistors each having emitter, base, and collector electrodes, the base of one of said transistors being coupled to the collector of another of said transistors, the emitters of said transistors being coupled together; and means for blocking said horizontal frequency generator upon the occurrence of an output signal from said vertical frequency generator comprising means for coupling the base of one of the transistors of said horizontal frequency generator to the collector of the output transistor of said vertical frequency generator.

2. A circuit as claimed in claim 1 wherein said potentials comprise television tuning and supply voltages respectively.

3. A circuit as claimed in claim 1 further comprising a comparison circuit coupled between one of said potentials to be measured and one of said generators having an input means for receiving one of said potentials to be measured, an output means coupled to one of said generator input means, and a reference voltage source coupled to said comparison circuit input means.

4. A circuit as claimed in claim 3 wherein said reference voltage source comprises a Zener diode and a resistor coupled in series therewith.

5. A circuit as claimed in claim 3, wherein said comparison circuit further comprises an input level adjustment means.